United States Patent [19]

Jogan et al.

[11] Patent Number: 5,429,786
[45] Date of Patent: Jul. 4, 1995

[54] METHOD OF MANUFACTURING RESIN MEMBER

[75] Inventors: Norio Jogan; Tetsuya Fujii; Akiyoshi Nagano; Toshihiko Mori, all of Aichi, Japan

[73] Assignee: Toyoda Gosei Co., Ltd., Aichi, Japan

[21] Appl. No.: 142,913

[22] Filed: Oct. 29, 1993

[30] Foreign Application Priority Data

Oct. 30, 1992 [JP] Japan ............... 4-315758

[51] Int. Cl.⁶ .............................. B29C 45/10
[52] U.S. Cl. ................... 264/255; 264/510; 264/259; 156/245
[58] Field of Search ............ 264/250, 260, 254, 255, 264/266, 328.1, 513, 510, 259; 156/79, 245; 296/70

[56] References Cited

U.S. PATENT DOCUMENTS

| | | | |
|---|---|---|---|
| 4,525,231 | 6/1985 | Wnuk | 156/245 |
| 4,766,025 | 8/1988 | Sanok et al. | 264/255 |
| 4,902,557 | 2/1990 | Rohrbacher | 264/513 |
| 5,292,465 | 3/1994 | Kobayashi et al. | 264/266 |

FOREIGN PATENT DOCUMENTS 55-156037 12/1980 Japan.
59-9054 1/1984 Japan.

*Primary Examiner*—Michael W. Ball
*Assistant Examiner*—Sam Chuan Yao
*Attorney, Agent, or Firm*—Cushman, Darby & Cushman

[57] ABSTRACT

A resilient surface sheet element 14 is vacuum molded from a resilient laminate sheet member 13 including a skin sheet 10 and a foam sheet 12. The resilient surface sheet element 14 is placed in a predetermined recess 16 of a female mold 15 for molding an instrument panel. After a first thermoplastic resin 18 is fed into a space between a male mold 17 and the resilient surface sheet element 14 placed in the female mold 15, the female mold 15 and the male mold 17 are closed tightly. The first thermoplastic resin 18 then flows through a first cavity section formed on a rear face of the resilient surface sheet element 14 to be integrated with the resilient surface sheet element 14. Before the first plastic resin 18 completely hardens in the first cavity section, a second thermoplastic resin 21 is injected from an injection gate 20 into a second cavity section adjacent to the first cavity section to securely fuse and join with the first thermoplastic resin 18.

15 Claims, 5 Drawing Sheets

METHOD OF MANUFACTURING RESIN MEMBER

This application claims priority from Japanese Patent Application No. 4-315758, filed Oct. 30, 1992, which is incorporated herein by reference.

BACKGROUND OF THE INVENTION

1. Field of the Invention

The present invention relates to a method for manufacturing a resin member, where a resilient surface sheet element having sufficient ability to restore itself after being compressed is adhesively attached to a part of a surface of the resin member.

2. Background Information

A resin member prepared by melding a thermoplastic resin is preferably used for casings of electric appliances and interior parts of vehicles, such as instrument panels, door trims, and glove compartments. Such a resin member is formed to a desirable shape by an appropriate molding method, for example, injection molding.

A recent trend has been to give a feeling of softness to a part of the surface of an instrument panel to enhance the value thereof. In a typical instrument panel IP shown in FIG. 1, the feeling of softness is imparted to an upper area A defined by the one-dot chain line, for example, by attaching a skin sheet including a foam layer to the area A. The bonding is typically implemented in accordance with the following steps to prevent the skin sheet from being stripped off the uneven surface of the instrument panel IP.

FIG. 2 is a cross sectional view showing the instrument panel IP taken along line 2—2 of FIG. 1. As shown in FIG. 2, the instrument panel IP consists of a soft member IP1 including the area A and a main member IP2, which are separately manufactured and then securely joined with and bonded to each other. The soft member IP1 is manufactured in the following manner. First, a skin sheet laminate 50 is prepared by laying a foam layer of polypropylene and a skin layer of polyvinyl chloride on one another. The skin sheet laminate 50 is then formed to a predetermined shape with the foam layer thereof positioned on the rear side. A thermoplastic resin such as polypropylene or acrylonitrile-butadiene-styrene copolymer (ABS) is press-formed to a rear face of the skin sheet laminate 50 to form a base element 52 integral with the skin sheet laminate 50. The main member IP2 is manufactured separately by injection molding a thermoplastic resin such as polypropylene or ABS.

The conventional method requires several extra steps for separate manufacture of the soft member IP1 and the main member IP2 as well as subsequent conveyance and assembly of the members IP1 and IP2. The manufacture of the instrument panel IP according to the conventional method undesirably consumes both time and labor. Moreover, lamination of the base element 52 of the soft member IP1 and the main member IP2 makes the final instrument panel IP undesirably heavy.

Some of the extra steps including conveyance may be eliminated by injecting a resin material of the main member IP2 to be integrated with the previously formed skin sheet laminate 50. Injection of the resin material, however, causes a high injection pressure to be locally applied onto the skin sheet laminate 50. This results in excessive compression of the foam layer of the skin sheet laminate 50 or produces crimps on the skin sheet laminate 50, thus lowering the quality of the final instrument panel IP. Crimping may be avoided by press forming the skin sheet laminate 50 together with a thermoplastic resin of the main member IP2. In this case, however, the thermoplastic resin gradually flows along the rear face of the skin sheet laminate 50 to form the main member IP2. This makes the flow of the thermoplastic resin distinctly observable on the exposed resin surface of the main member IP2 to significantly damage the ornamental effects of the surface.

SUMMARY OF THE INVENTION

One object of the invention is to provide a novel method of manufacturing a resin member including a resilient surface sheet element on a part of the surface of the resin member.

Another object of the invention is to simplify the method of manufacturing a resin member and lighten the weight of the final resin member while maintaining the quality of the final product.

A resin member including a resilient surface sheet element on a part of the surface thereof is manufactured according to the method of the present invention. First, the resilient surface sheet element is formed to have a predetermined shape that corresponds to the part of the surface of the resin member where the resilient surface sheet element is finally in contact with and adheres to the resin member. At the same time, the first mold and the second mold that mate with each other for molding the resin member are prepared. The resilient surface sheet element may be prepared by forming and trimming a sheet member to the predetermined shape. Second, the resilient surface sheet element of the predetermined shape is set in one of the first and the second molds. Third, a first thermoplastic resin is fed at a predetermined feeding temperature into a first cavity section (corresponding to the part of the surface of the resin member to which the resilient surface sheet element adheres) formed between the resilient surface sheet element and the other mold prior to closing and pressing the first and the second molds against each other. The mold closing and pressing makes the first thermoplastic resin fill through the first cavity section to be integrated with the resilient surface sheet element. Namely, the first thermoplastic resin spreads over a rear face of the resilient surface sheet element to be integrated therewith. This mold closing and pressing process for integrating the first thermoplastic resin with the resilient surface sheet element does not locally apply an undesirably high pressure onto the resilient surface sheet element, and thus, the compression restoring ability of the resilient surface sheet element is maintained and crimping of the resilient surface sheet element is prevented.

In a subsequent step, a second thermoplastic resin is injected at a predetermined injection temperature into a second cavity section adjacent to the first cavity section before the first thermoplastic resin is completely hardened in the first cavity section. The predetermined injection temperature is higher than the feeding temperature of the first thermoplastic resin. The second thermoplastic resin immediately fills the second cavity section, that is, an area other than the rear face of the resilient surface sheet element, at the predetermined injection temperature. The second thermoplastic resin flows into the first thermoplastic resin, which is being hardened in the first cavity section on the rear face of the resilient surface sheet element, to fuse and join with the first thermoplastic resin. Since the first thermoplastic resin is pressed between the first and second molds and not completely hardened in the first cavity section, the second thermoplastic resin flows deeper on a central portion thereof into the first thermoplastic resin for securely fusing with and adhering to the first thermoplastic resin.

BRIEF DESCRIPTION OF THE DRAWINGS

Other objects, features, and characteristics of the present invention will become apparent upon consideration of the following description and the appended claims with reference to the accompanying drawings, all of which form a part of this specification, wherein like reference numerals designate corresponding parts in the various figures. In the drawings:

DETAILED DESCRIPTION OF THE PRESENTLY PREFERRED EXEMPLARY EMBODIMENTS

The method of manufacturing a resin member in accordance with the present invention is described in detail based on a preferred embodiment thereof, making reference to the accompanying drawings. Description herein primarily regards manufacture of an instrument panel IP shown in FIG. 1.

Figure 3:
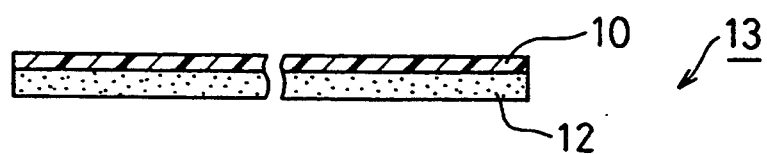
FIG. 3 is a cross sectional view showing a sheet member 13, which forms a resilient surface sheet element 14 adhering to a part of the surface of the instrument panel IP according to the method of the present invention.

A resilient laminate sheet member 13 (FIG. 3) is prepared in a first step, which includes a flat skin sheet 10 of a thermoplastic resin such as polypropylene and a flat soft foam sheet 12 also composed of polypropylene. The skin sheet 10 and the foam sheet 12 may be laminated by a conventional laminating method to form the resilient laminate sheet member 13. The foam sheet 12 is prepared by expanding foaming material at an expansion ratio of fifteen through thirty times and functions as a cushion layer with sufficient ability to restore it after being compressed.

Figure 1:
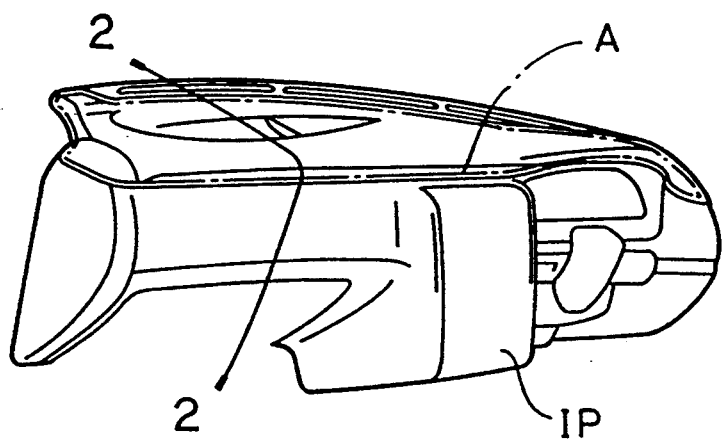
FIG. 1 is a perspective view schematically illustrating 10 an instrument panel IP.
Figure 2:
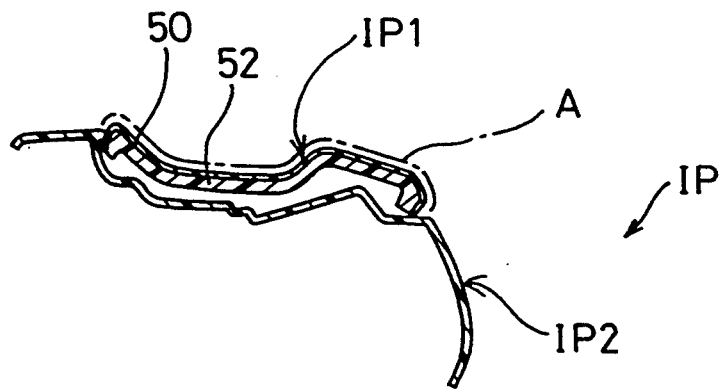
FIG. 2 is a cross sectional view showing the instrument panel IP manufactured by a conventional method, taken along line 2—2 of FIG. 1.
Figure 4:
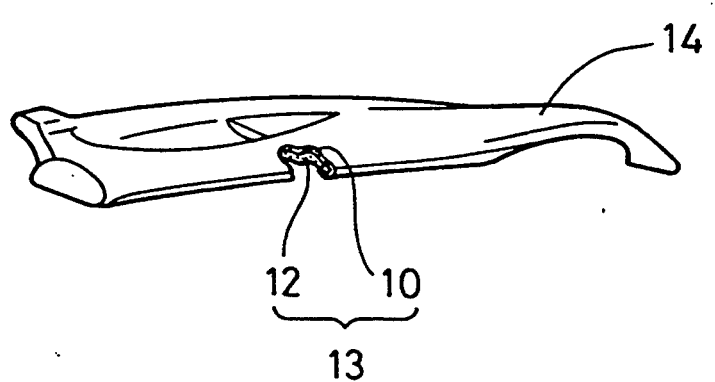
FIG. 4 is a perspective view schematically showing the resilient surface sheet element 14.

After the skin sheet 10 and the foam sheet 12 of the resilient laminate sheet member 13 are heated to a temperature between 130° C. and 210° C., or preferably to 180° C., the hot resilient laminate sheet member 13 is vacuum molded with a prescribed mold to have a predetermined shape corresponding to an area A on the upper face of the instrument panel IP (FIG. 1). The vacuum molded resilient laminate sheet member 13 is then trimmed to the predetermined shape on or after removal from the mold, so as to form a resilient surface sheet element 14 having a shape as shown in FIG. 4 and a substantially uniform thickness as about 3.7 millimeters. An ornamental pattern, such as grains on the molding surface of the mold, is transferred to a surface of the skin sheet 10 through heating and vacuum molding of the resilient laminate sheet member 13.

Figure 5:
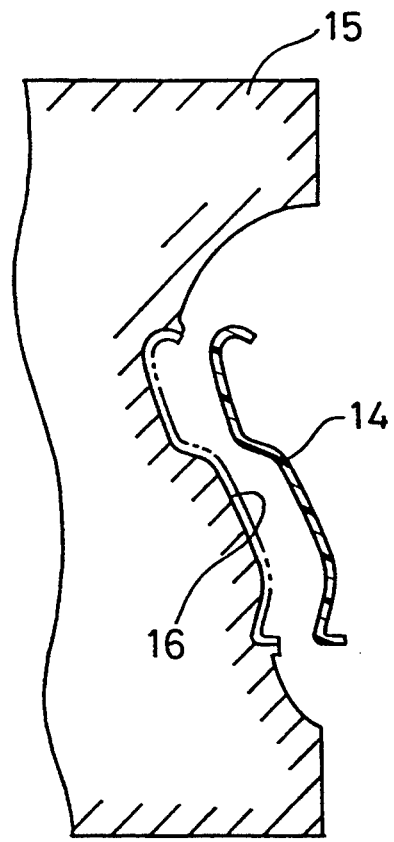
FIG. 5 is a cross sectional view showing the resilient surface sheet element 14 placed in a female mold 15 for molding the instrument panel IP taken along line 2—2 of FIG. 1.

FIG. 5 is a cross sectional view showing the female mold 15 with the resilient surface sheet element 14 of the instrument panel IP taken along line 2—2 in FIG. 1. The thus prepared resilient surface sheet element 14 is placed in a female mold 15 for molding the instrument panel IP as shown in FIG. 5. More specifically, the resilient surface sheet element 14 is placed in a predetermined recess 16 defined by the two-dot chain line in FIG. 5. The predetermined recess 16 is deeper by approximately about one millimeter than the rest of the molding surface of the female mold 15, taking into consideration the thickness (about 3.7 millimeters) of the resilient surface sheet element 14, compression of the resilient surface sheet element 14 in the mold closing process, and restoration of the resilient surface sheet element 14 after mold release.

Figure 7:
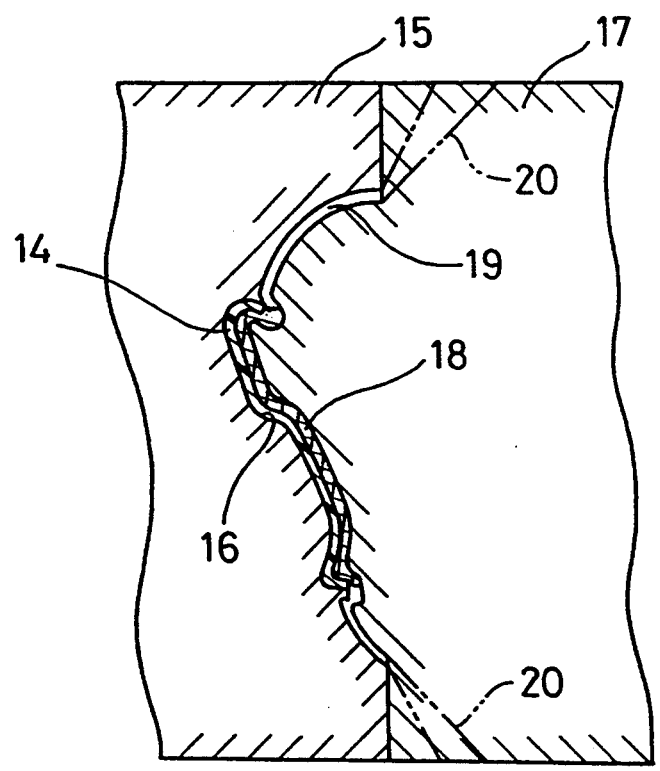
FIG. 7 is a cross sectional view showing a process of mold closing and pressing the first thermoplastic resin 18.

A first thermoplastic resin 18 is then fed into a space between a male mold 17 and the resilient surface sheet element 14 set in the predetermined recess 16 of the female mold 15. The amount of thermoplastic resin 18 fed into the space is determined at a stage of designing an instrument panel IP by taking account of the average thickness of the resin 18 through a rear face of the resilient surface sheet element 14 of the final instrument panel IP designed, the surface conditions on the rear face of the resilient surface sheet element 14, and the area of the rear face of the resilient surface sheet element 14. In a mold closing process, the determined feeding amount of the thermoplastic resin 18 should fill through at least a first cavity section formed on the rear face of the resilient surface sheet element 14 in a cavity 19 (FIG. 7) for molding the instrument panel IP (described later). A measured amount of the thermoplastic resin 18 may be supplied onto a molding surface of the male mold 17 from an external resin feeder unit (not shown) under such a condition that the female and male molds 15, 17 are separate from each other, or alternatively fed by a fixed amount feeding mechanism (not shown), which may be built in the male mold 17. The thermoplastic resin 18, for example, polypropylene, is heated to a predetermined feeding temperature, for example, approximately 180° C., prior to feeding.

After the thermoplastic resin 18 is fed into the space between the male mold 17 and the resilient surface sheet element 14, one of the molds 15 or 17 is moved to and pressed against the other for secure mold closing. In this mold closing process, the cavity 19 for molding the instrument panel IP is formed between the molding surface of the male mold 17 and the molding surface of the female mold 15 or the rear face of the resilient surface sheet element 14 set in the predetermined recess 16 as clearly seen in FIG. 7. The thermoplastic resin 18 fed into the space and pressed therein fills through the first cavity section formed on the rear face of the resilient surface sheet element 14 in the cavity 19 to be integrated with the resilient surface sheet element 14.

Figure 8:
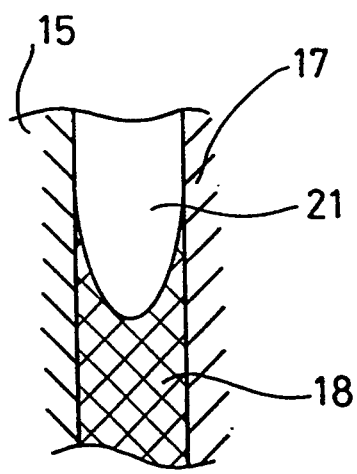
FIG. 8 shows fusing and bonding of the first thermoplastic resin 18 with a newly injected second thermoplastic resin 21.
Figure 6:
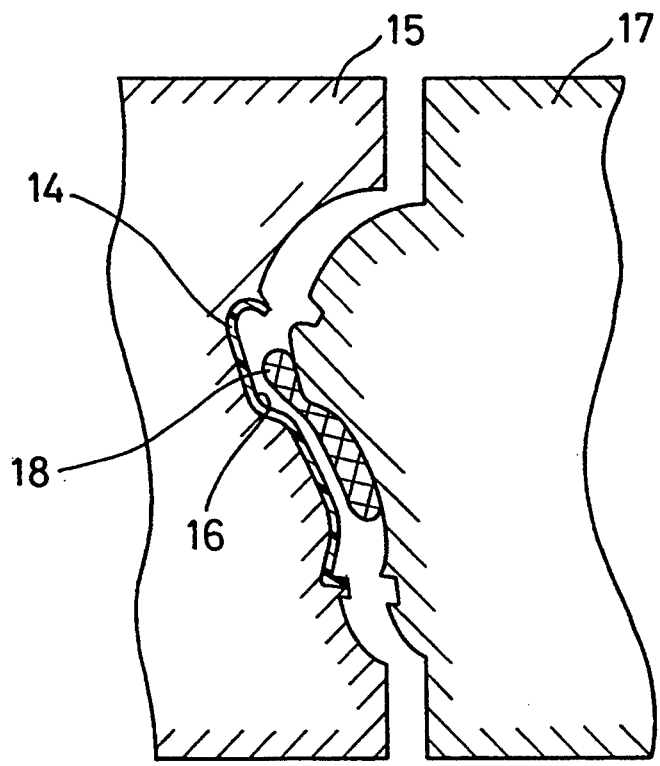
FIG. 6 is a cross sectional view showing a process of feeding a first thermoplastic resin 18 into a space between a male mold 17 and the resilient surface sheet element 14 set in the female mold 15.

Before the thermoplastic resin 18 filling through the first cavity section formed on the rear face of the resilient surface sheet element 14 is completely hardened in the mold closing and pressing process, an injection gate 20 of the male mold 17 is opened. And then a second thermoplastic resin 21 (FIG. 8) is injected from the injection gate 20 to a second cavity section. That is, the second thermoplastic resin 21 is injected into a residual area of the cavity 19 other than the first cavity section. Injection of the second thermoplastic resin 21 may be implemented immediately after joining and pressing the male and female molds 15, 17 with and against each other. More concretely, the second thermoplastic resin 21 is injected within a time period from approximately zero seconds to approximately 3.5 seconds after the male and female molds are joined. The second thermoplastic resin 21 is identical with the first thermoplastic resin 18, and is heated to a predetermined injection temperature which is sufficiently higher than the feeding temperature of the first thermoplastic resin 18. The second thermoplastic resin 21 may be polypropylene, which is molten at approximately 210° C. and injected at 350 kg/cm². The injection gate 20 is placed in the male mold 17 at a predetermined position separate from the cross section of the instrument panel IP taken along line 2—2 of FIG. 1.

The second thermoplastic resin 21 immediately fills the second cavity section, that is, an area other than the rear face of the resilient surface sheet element 14, at the predetermined injection temperature. The second thermoplastic resin 21 flows into the first thermoplastic resin 18 being hardened in the first cavity section on the rear face of the resilient surface sheet element 14 and fuses and joins with the first thermoplastic resin 18. Since the first thermoplastic resin 18 is pressed between the male mold 17 and the female mold 15 and not completely hardened in the first cavity section, the second thermoplastic resin 21 flows deeper at a central portion thereof into the first thermoplastic resin 18 as clearly seen in FIG. 8. The second thermoplastic resin 21 is injected at the predetermined injection temperature (for example, 210° C.) sufficiently higher than the feeding temperature (for example, 180° C.) of the first thermoplastic resin 18. Such a high injection temperature of the second thermoplastic resin 21 melts the first thermoplastic resin 18 at a boundary between the first and the second thermoplastic resins 18 and 21, thus allowing the first thermoplastic resin 18 to securely fuse with and adhere to the second thermoplastic resin 21. After complete integration of the first and second resins 18 and 21 and sufficient cooling, a final product, that is, the instrument panel IP (see FIG. 1) including the resilient surface sheet element 14 on a part of surface thereof, is removed from the female and male molds 15 and 17.

As described above, according to the method of the embodiment, the first thermoplastic resin 18 fills through the cavity at the rear face of the resilient surface sheet element 14 pressed between the female mold 15 and the male mold 17, and is securely integrated with the resilient surface sheet element 14. In this pressing and integrating process, no high injection pressure is locally applied onto the resilient surface sheet element 14. This results in favorable integration of the first thermoplastic resin 18 with the rear face of the resilient surface sheet element 14 without damaging the compression restoring ability of the resilient surface sheet element 14 or causing crimps on the resilient surface sheet element 14. Before the first thermoplastic resin 18 is completely hardened in the first cavity section on the rear face of the resilient surface sheet element 14, the second thermoplastic resin 21 is injected into the second cavity section, that is, an area other than the rear face of the resilient surface sheet element 14. The second thermoplastic resin 21 is identical with the first thermoplastic resin 18 but heated to a predetermined injection temperature that is sufficiently higher than a feeding temperature of the first thermoplastic resin 18. The injected second thermoplastic resin 21 immediately fills the second cavity section and flows into the first thermoplastic resin 18, which is hardening in the first cavity section to securely fuse with and adhere to the first thermoplastic resin 18. The method of the embodiment accordingly realizes efficient and simple manufacture of the instrument panel IP including the resilient surface sheet element 14 on a part of the surface thereof. The instrument panel IP thus manufactured is favorably light in weight and maintains the requisite high quality.

As mentioned above, the second thermoplastic resin 21 flows deeper at a central portion thereof into the first thermoplastic resin 18. This makes the weld line formed on a surface of the instrument panel IP desirably thinner. The method of the embodiment accordingly makes a weld line between the two resins inconspicuous even on an exposed resin surface of the instrument panel IP, thus significantly improving the ornamental effects on the surface of the instrument panel IP.

Figure 9:
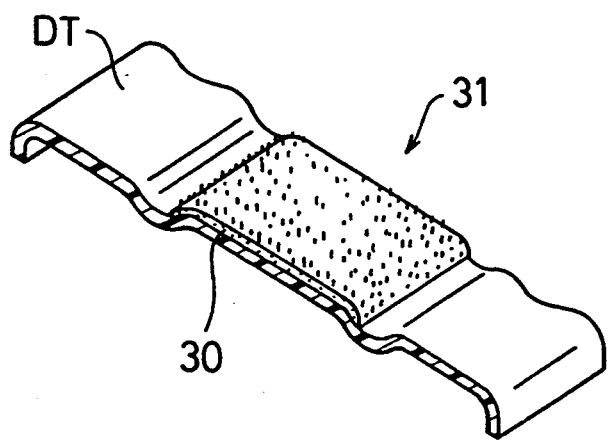
FIG. 9 is a perspective view illustrating a door trim DT manufactured according to a modified method of the invention.
Figure 10:
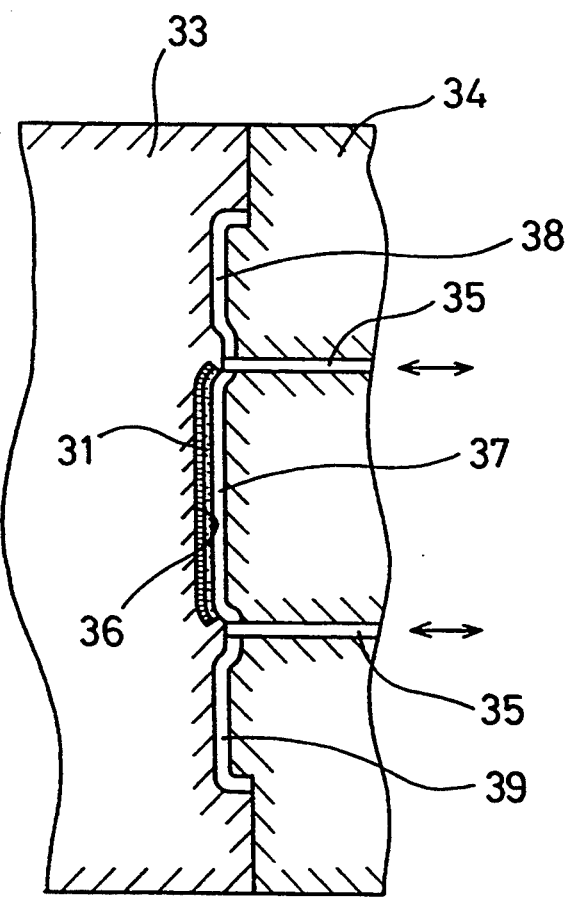
FIG. 10 shows a manufacturing process according to the modified method.

Another embodiment of the present invention is described based on FIGS. 9 and 10. A door trim DT manufactured in this embodiment includes a fluffed sheet element 31, which is prepared by fluffing a cushion layer 30, on a part of the surface thereof as shown in FIG. 9.

In this embodiment, the door trim DT is manufactured with a female mold 33 and a male mold 34 mating with each other shown in FIG. 10. The male mold 34 is provided with a fence 35, which freely protrudes from a molding surface of the male mold 34 into a cavity formed between the male mold 34 and the female mold 33 so as to define the contour of the fluffed sheet element 31 set in the female mold 33. The fluffed sheet element 31 formed to a predetermined shape is set at a predetermined position 36 in the female mold 33. A first thermoplastic resin is then fed into a first cavity section 37 defined by a rear face of the fluffed sheet element 31 and the opposing face of the male mold 34.

In a subsequent mold closing and pressing step, the first thermoplastic resin is pressed in the first cavity section 37 against the rear face of the fluffed sheet element 31 while the fence 35 protrudes from the molding surface of the male mold 34. The fence 35 may protrude into the cavity at any desirable time, before or after feeding the first thermoplastic resin, as long as protrusion is completed prior to the mold closing process. During the mold closing and pressing process, the first thermoplastic resin fills through the first cavity section 37 on the rear face of the fluffed sheet element 31 to be securely integrated with the fluffed sheet element 31.

Before the first thermoplastic resin completely hardens in the first cavity section 37, the fence 35 is pulled back to the molding surface of the male mold 34 and a second thermoplastic resin is injected into second and third cavity sections 38 and 39, which are adjacent to the first cavity section 37 on the rear face of the fluffed sheet element 31. The second thermoplastic resin is identical with the first thermoplastic resin but is heated to a predetermined injection temperature sufficiently higher than a feeding temperature of the first thermoplastic resin. The injected second thermoplastic resin immediately fills through the second and third cavity sections 38 and 39 at the predetermined injection temperature and flows into the first thermoplastic resin, which is hardening in the first cavity section 37 to securely fuse with and adhere to the first thermoplastic resin.

This modified method of the embodiment accordingly realizes an efficient and simple method of manufacture for a door trim DT including the fluffed sheet element 31, which has sufficient compression restoring ability on a part of the surface thereof. The door trim DT thus manufactured is favorably light in weight and maintains a requisite high quality. The method also makes any weld line between the two resins inconspicuous, even on an exposed resin surface of the door trim DT, and thus significantly improves the ornamental effects on the surface of the door trim DT.

Since there may be many modifications, alterations, and changes without departing from the scope or spirit of the essential characteristics of the invention, it is clearly understood that the above embodiments are only illustrative and not restrictive in any sense. For example, the method of the invention may be applicable to flat resin members as well as three-dimensional resin members described in the above embodiments. In the modified embodiment, the male mold 34 may not include the fence 35 that freely protrudes from the molding surface of the male mold 34 to define the contour of the fluffed sheet element 31.

As described in detail above, according to the method of the invention, the first thermoplastic resin fills through the rear face of the resilient surface sheet element pressed between the first and second molds, and is securely integrated with the resilient surface sheet element. This results in favorable integration of the first thermoplastic resin with the rear face of the resilient surface sheet element without damaging the compression restoring ability of the resilient surface sheet element or causing crimps on the resilient surface sheet element. Before the first thermoplastic resin is completely hardened in the first cavity section on the rear face of the resilient surface sheet element, the second thermoplastic resin is injected into the second cavity section, an area other than the rear face of the resilient surface sheet element. The second thermoplastic resin is identical with the first thermoplastic resin but is heated to a predetermined injection temperature which is higher than a feeding temperature of the first thermoplastic resin. The injected second thermoplastic resin immediately fills the second cavity section and flows into contact with the first thermoplastic resin. The second thermoplastic resin securely fuses with and adheres to the first thermoplastic resin. The method of the invention accordingly realizes efficient and simple manufacture of the resin member including the resilient surface sheet element on a part of the surface thereof. The resin member thus manufactured is favorably light in weight and has a requisite quality.

The second thermoplastic resin flows deeper at a central portion thereof into the hardening first thermoplastic resin. This makes a weld line formed on a surface of the resin member desirably thinner. The method of the invention accordingly makes a weld line between the two resins inconspicuous even on an exposed resin surface of the resin member, thus significantly improving the ornamental effects on the surface of the resin member.

While the present invention has been described in connection with what are presently considered to be the most practical and preferred embodiments, it is to be understood that the invention is not to be limited to the disclosed embodiment, but rather is intended to cover various modifications included within the spirit and scope of the appended claims.

What is claimed is:

1. A method of manufacturing an article, part of which comprises a resilient surface element, using a first mold and a second mold, which mate with each other and form a cavity therebetween for molding said article, said cavity including a first cavity section corresponding to said resilient surface element and a second cavity section formed adjacent to said first cavity section, said method comprising the steps of:
    (a) forming a resilient surface element in a predetermined shape corresponding to the part being manufactured;
    (b) setting the resilient surface element in said first mold so as to be disposed at a predetermined position in said first cavity section while said first mold is separate from said second mold;
    (c) feeding a volume of a first thermoplastic resin into said first cavity section between said second mold and said resilient surface element set in said first mold, and closing and pressing said first mold and said second mold against each other, the volume of said first thermoplastic resin being such that it spreads out over only said resilient surface element; and
    (d) injecting a second thermoplastic resin into said second cavity section before said first thermoplastic resin is completely hardened in said first cavity section.

2. A method in accordance with claim 1, wherein said step (d) comprises the step of:
    injecting said second thermoplastic resin into said second cavity section within a time period from approximately zero seconds to approximately 3.5 seconds after said mold closing in said step (d).

3. A method in accordance with claim 1, wherein said step (a) further comprises the steps of:
    (a-1) manufacturing a resilient laminate sheet member by laminating a skin sheet and a foam sheet; and
    (a-2) adjusting a shape of said resilient laminate sheet member to produce said resilient surface sheet element, where said foam sheet is to be directly in contact with and adhere to said resin member.

4. A method in accordance with claim 3, wherein said step (a-1) further comprises the step of:
    preparing said foam sheet by expanding foaming material at an expansion rate between fifteen and thirty times.

5. A method in accordance with claim 1, wherein said resin member is an interior member for vehicles.

6. A method in accordance with claim 3, wherein said resin member and said skin sheet and said foam sheet of said resilient surface sheet element are all composed of an olefin resin.

7. A method in accordance with claim 6, wherein said olefin resin is polypropylene.

8. A method in accordance with claim 3, wherein said step (a-2) further comprises the step of:

vacuum molding said resilient laminate sheet member to form said resilient surface sheet element of said predetermined shape.

9. A method in accordance with claim 8, wherein said resilient laminate sheet member is heated to a temperature allowing an ornamental pattern on a molding surface of a vacuum mold to be transferred to said skin sheet.

10. A method in accordance with claim 1, wherein said first thermoplastic resin and said second thermoplastic resin are identical with each other.

11. A method in accordance with claim 10, wherein an injection temperature of said second thermoplastic resin injected in said step (d) is higher than a feeding temperature of said first thermoplastic resin fed in said step (c).

12. A method in accordance with claim 1, wherein said step (a) further comprises the step of:

(a-3) manufacturing a sheet member having a fluffed cushion layer therein and forming said sheet member to said predetermined shape to prepare said resilient surface sheet element, where said cushion layer is to be directly in contact with and adhere to said resin member.

13. A method for manufacturing a resin member, comprising the steps of:

forming a resilient surface sheet element;

placing said resilient surface sheet element on a first mold member;

feeding a heated first thermoplastic resin to a second mold member;

pressing the first and second mold members together so that said first thermoplastic resin integrated with said resilient surface sheet element on a rear cavity thereof; and injecting a heated second thermoplastic resin, between said first and second mold members into a second cavity so as to contact said first thermoplastic resin away from said rear cavity;

wherein said second thermoplastic resin is heated to a temperature higher than said first thermoplastic resin so as to fuse the first and second resins together.

14. A method as claimed in claim 13, wherein said injecting step includes allowing said second thermoplastic resin to penetrate said first thermoplastic resin deeper at a center portion of said second cavity than at sides of said second cavity.

15. A method as claimed in claim 14, wherein said second thermoplastic resin is the same type resin as said first thermoplastic resin.

* * * * *